US012454883B2

(12) United States Patent
Jan et al.

(10) Patent No.: US 12,454,883 B2
(45) Date of Patent: Oct. 28, 2025

(54) HYBRID NEURAL NETWORK FOR DRILLING ANOMALY DETECTION

(71) Applicant: Schlumberger Technology Corporation, Sugar Land, TX (US)

(72) Inventors: Aymeric Lilian Jan, Clamart (FR); Fatma Mahfoudh, Cambridge (GB); Gordana Draskovic, Clamart (FR); Cheolkyun Jeong, Sugar Land, TX (US); Yingwei Yu, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 491 days.

(21) Appl. No.: 17/929,412

(22) Filed: Sep. 2, 2022

(65) Prior Publication Data
US 2023/0082520 A1    Mar. 16, 2023

Related U.S. Application Data

(60) Provisional application No. 63/260,843, filed on Sep. 2, 2021.

(51) Int. Cl.
*E21B 44/00*  (2006.01)
*E21B 47/095*  (2012.01)
*E21B 47/10*  (2012.01)

(52) U.S. Cl.
CPC ............ *E21B 44/00* (2013.01); *E21B 47/095* (2020.05); *E21B 47/10* (2013.01); *E21B 2200/20* (2020.05); *E21B 2200/22* (2020.05)

(58) Field of Classification Search
CPC ........ E21B 44/00; E21B 47/095; E21B 47/10; E21B 2200/20; E21B 2200/22; E21B 7/00
See application file for complete search history.

(56) References Cited

U.S. PATENT DOCUMENTS 5,502,435 A  *  3/1996  Ralston ................ H01H 33/563
                                                        702/140
10,249,069 B1 *  4/2019  Kerzner ................ G06V 20/52
(Continued)

FOREIGN PATENT DOCUMENTS

WO    WO-2019222012 A1 * 11/2019  ............. G06F 16/84
WO    WO-2020154399 A1 *  7/2020  ......... E21B 47/0025

OTHER PUBLICATIONS

Mardanirad, Sajjad, and et al. "The application of deep learning algorithms to classify subsurface drilling lost circulation severity in large oil field datasets." SN Applied Sciences 3, No. 9 (Aug. 26, 2021): 785 (Year: 2021).*

(Continued)

*Primary Examiner* — Douglas Kay
(74) *Attorney, Agent, or Firm* — Jeffrey D. Frantz

(57) ABSTRACT

The present disclosure relates to systems, non-transitory computer-readable media, and methods for detecting a washout or other anomaly event in a wellbore. In particular, in one or more embodiments, the disclosed systems receive a plurality of measurements including a measured flow rate into the wellbore, a measured weight on a drill bit in the wellbore, a measured depth of the drill bit in the wellbore, and a measured pressure at a standpipe of the wellbore. In one or more embodiments, the disclosed systems estimate one or more parameters of a physical model for determining a theoretical estimate of the standpipe pressure. In one or more embodiments, the disclosed systems determine a probability that the washout or other anomaly event is occurring in the wellbore based at least partially upon the measurements and the theoretical estimate of the standpipe pressure.

18 Claims, 10 Drawing Sheets

(56) References Cited

U.S. PATENT DOCUMENTS

| | | | |
|---|---|---|---|
| 11,959,374 B2* | 4/2024 | Parak | E21B 47/00 |
| 2011/0155462 A1* | 6/2011 | Du Castel | G06N 7/01 |
| | | | 175/24 |
| 2015/0184504 A1 | 7/2015 | Ringer et al. | |
| 2018/0171774 A1* | 6/2018 | Ringer | E21B 47/002 |
| 2019/0302291 A1* | 10/2019 | Lolla | G01V 1/288 |
| 2019/0323323 A1 | 10/2019 | Zhang et al. | |
| 2019/0324166 A1* | 10/2019 | Lolla | G01V 1/42 |
| 2019/0353012 A1 | 11/2019 | Al Gharbi et al. | |
| 2020/0175444 A1* | 6/2020 | Fox | G06Q 10/103 |
| 2020/0355839 A1 | 11/2020 | Jeong | |
| 2020/0370409 A1* | 11/2020 | Yu | E21B 47/12 |
| 2021/0222552 A1 | 7/2021 | Gao | |
| 2021/0248500 A1* | 8/2021 | Amur Varadarajan | |
| | | | G06N 20/00 |
| 2022/0003108 A1* | 1/2022 | Parak | E21B 44/00 |

OTHER PUBLICATIONS

Qu H, and et al: Supernova classification with a convolutional neural network. The Astronomical Journal. Jul. 20, 2021;162(2):67 (Year: 2021).*

Aldred, W. et al., "Drilling Automation", Oilfield Review, Summer 2012, 24(2), pp. 18-22.

Aldred, W. et al., "Development and Testing of a Rig-Based Quick Event Detection System to Mitigate Drilling Risks", SPE/IADC-111757, presented at the SPE/IADC Drilling Conference held in Orlando, Florida, USA, Mar. 4-6, 2008, 12 pages.

Wong, R et al., "Advances in Real-Time Event Detection While Drilling", SPE/IADC-163515, presented at the SPE/IADC Drilling Conference and Exhibition held in Amsterdam, The Netherlands, Mar. 5-7, 2013, 7 pages.

Willersrud, A. et al., "Drillstring Washout Diagnosis Using Friction Estimation and Statistical Change Detection", IEEE Transactions on Control Systems Technology. 2015. 23(5), pp. 1886-1900.

Karpatne, A. et al., 2017, Theory-Guided Data Science: A New Paradigm for Scientific Discovery from Data, IEEE Transactions on Knowledge and Data Engineering, 2017, 29(10), pp. 2318-2331.

Kendall, A. et al., "Multi-Task Learning Using Uncertainty to Weigh Losses for Scene Geometry and Semantics". 2018 IEEE/CVF Conference on Computer Vision and Pattern Recognition, pp. 7482-7491.

Jeong, C. et al., "A Physics Model Embedded Hybrid Deep Neural Network for Drillstring Washout Detection", SPE-199629-MS, presented at the IADC/SPE International Drilling Conference, Galveston, Texas, U.S.A. Mar. 2020, 9 pages.

Search Report and Written Opinion of International Patent Application No. PCT/US2022/075908 dated Dec. 20, 2022, 12 pages.

* cited by examiner

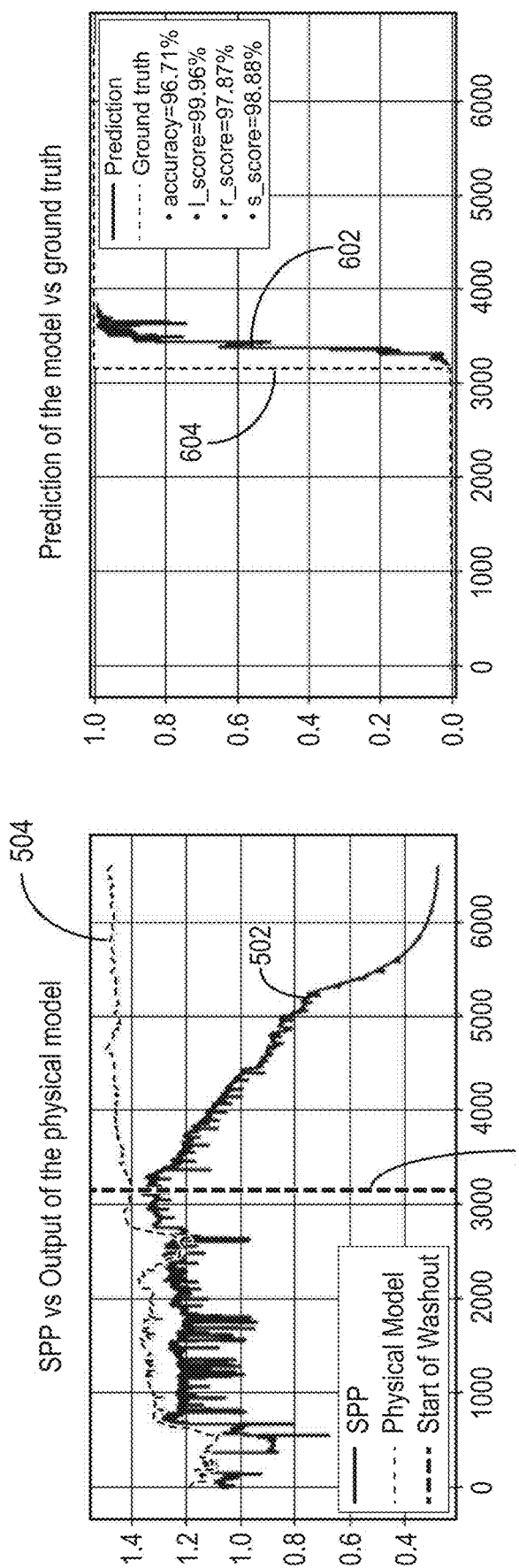

HYBRID NEURAL NETWORK FOR DRILLING ANOMALY DETECTION

RELATED APPLICATIONS

This application claims priority to and the benefit of U.S. Provisional Patent Application No. 63/260,843, filed on Sep. 2, 2021, and titled "HYBRID NEURAL NETWORK FOR WASHOUT DETECTION," which is hereby incorporated herein by reference in its entirety.

BACKGROUND

Recent years have seen significant improvements in extracting and identifying operational performance data associated with subterranean drilling. Unfortunately, a number of problems still exist with conventional systems for identifying operation anomalies. For example, conventional drilling anomaly systems suffer from low interpretability. In addition, certain conventional drilling anomaly systems are not capable of real-time anomaly identification. Moreover, some conventional drilling anomaly systems promote selective (and subjective) review of certain drilling parameters that may appear anomalous but are not.

Conventional drilling anomaly systems are often of little use in real-time field operation. For example, some conventional drilling anomaly systems use measures that aggregate drilling operation data over time. Accordingly, such conventional drilling anomaly systems are typically incapable of identifying anomalous drilling operation processes as they occur because an indicator is still (over the aggregate) within tolerance or an accepted range. As a result, conventional drilling anomaly systems operate with reduced accuracy and real-time effectiveness.

For example, one type of drilling anomaly is a washout (also called a washout event), which refers to the generation of an enlarged region of a wellbore. A washout in an open hole section of the wellbore is larger than the original hole size or size of the drill bit. Washout enlargement can be caused by excessive bit jet velocity, soft or unconsolidated formations, in-situ rock stresses, mechanical damage by bottom hole assembly (BHA) components, chemical attack and swelling, or weakening of shale as it contacts fresh water. Generally speaking, washouts become more severe with time.

Former purely statistical or data-driven models have been proposed to predict or detect washouts or other drilling anomalies; however, these models do not provide a reliable solution because they generate too many false positives and false negatives. Additionally, former systems suffer from delayed detections of washout events or other drilling anomaly events. For example, former systems could take several minutes before detecting that a washout event is occurring, causing overly long delays before a response with remedial steps to the washout event is initiated.

These along with additional problems and issues exist with regard to conventional drilling anomaly detection systems. Therefore, what is needed is an improved system and method for predicting or detecting washouts and other drilling anomaly events.

BRIEF SUMMARY

Embodiments of the present disclosure provide benefits and/or solve one or more of the foregoing or other problems in the art with systems, non-transitory computer-readable media, and methods for detecting anomalies during a drilling operation using a hybrid combination of a physical model and one or more neural networks. In some embodiments, the disclosed systems, non-transitory computer-readable media, and methods receive measurements related to the drilling operation, estimate parameters of a physical model, determine theoretical estimations of a drilling characteristic based on the physical model, and determine probabilities that a drilling anomaly event (such as a drill string washout event) is occurring in the wellbore based on the theoretical estimation of the drilling characteristic and a measurement of the drilling characteristic. In some embodiments, the disclosed systems, non-transitory computer-readable media, and methods utilize a convolutional neural network to estimate the parameters of the physical model. In some embodiments, the disclosed systems, non-transitory computer-readable media, and methods utilize a drilling event classification neural network to determine the probabilities that the drilling anomaly event is occurring.

The following description sets forth additional features and advantages of one or more embodiments of the disclosed methods, non-transitory computer-readable media, and systems. In some cases, such features and advantages are evident to a skilled artisan from the description or learned by the practice of the disclosed embodiments.

BRIEF DESCRIPTION OF THE DRAWINGS

The detailed description provides one or more embodiments with additional specificity and detail through the use of the accompanying drawings, as briefly described below.

FIG. 5 illustrates a graph showing measured standpipe pressure and output of a physical model for estimating theoretical standpipe pressure, in accordance with one or more embodiments.

FIG. 6 illustrates a graph showing a prediction of the drilling anomaly detection system compared with a ground truth of a drill string washout event, in accordance with one or more embodiments.

FIG. 7A shows measurements of flow rate, weight on the drill bit (WoB), depth of the drill bit, and standpipe pressure during the washout event.

FIG. 7B shows the probability of a washout during the drilling operation.

DETAILED DESCRIPTION

Figure 1:
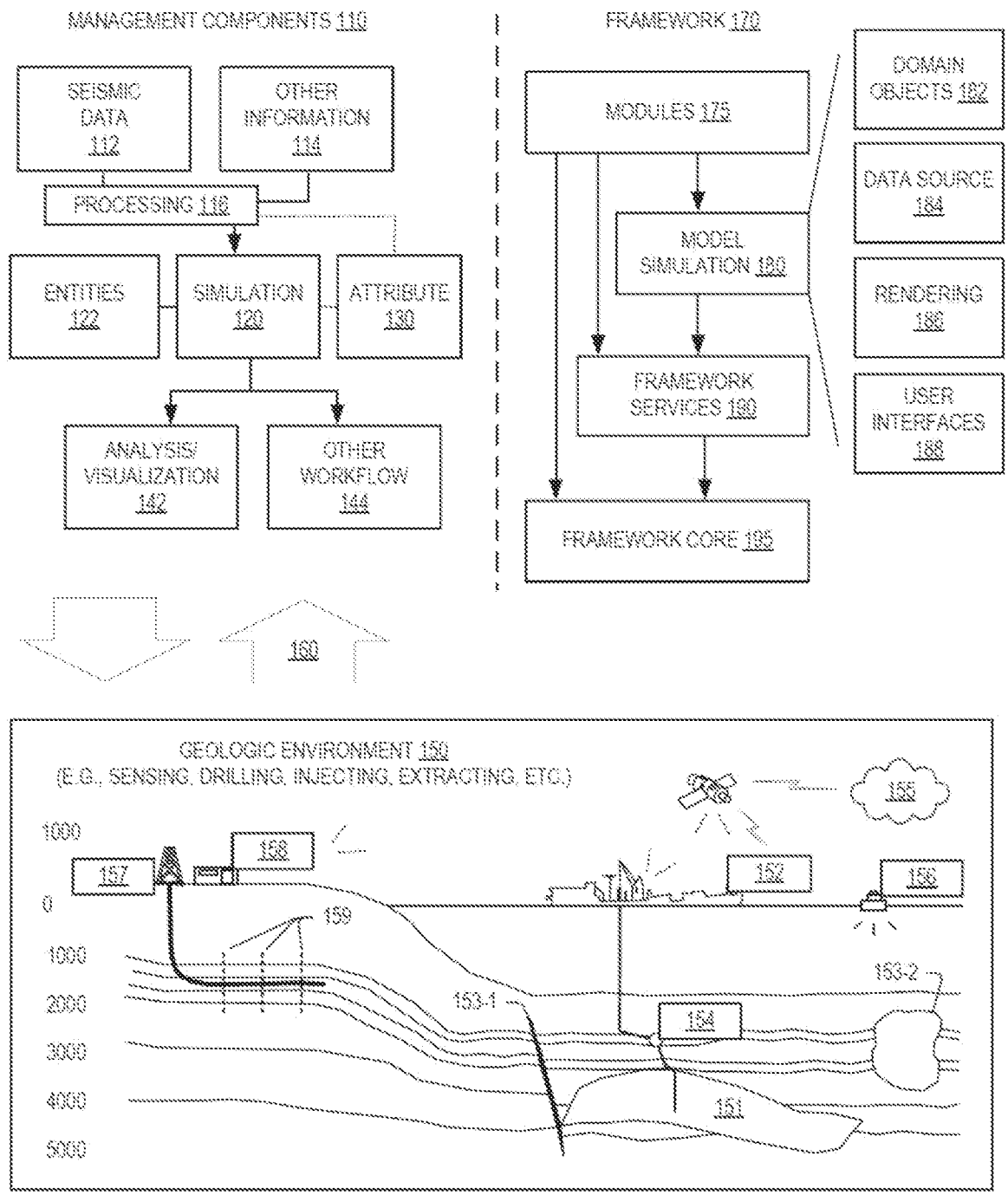
FIG. 1 illustrates a diagram of an environment in which a drilling anomaly detection system can operate in accordance with one or more embodiments.

This disclosure describes one or more embodiments of a drilling anomaly detection system that accurately detects drilling anomaly events, such as a drill string washout event. The drilling anomaly detection system takes a hybrid approach to determining a probability that a washout event or other anomaly event is occurring at a given time during drilling operations. The hybrid approach is a combination of a physical model with one or more neural networks. For example, in some embodiments, a convolutional neural network estimates physical parameters used by the physical model to estimate one or more drilling characteristics, while a drilling event classification neural network determines probabilities of the anomaly event based on the estimated one or more drilling characteristics.

As described herein, certain embodiments of the drilling anomaly detection system receive physical measurements related to a wellbore. The physical measurements can include measurements of flow rate into a wellbore, measurements of weights on a drill bit in the wellbore, measurements of depths of the drill bit in the wellbore, measurements of standpipe pressures associated with a standpipe of the wellbore, etc. The drilling anomaly detection system can estimate parameters of a physical model that represents physical relationships between various drilling characteristics. For example, the drilling anomaly detection system can use the physical model to determine a theoretical estimation of a drilling characteristic (such as the standpipe pressure) using the physical measurements and the estimated parameters. The drilling anomaly detection system can utilize a neural network to determine probabilities that a drilling anomaly event is occurring. The neural network can base the probability determinations on the theoretical estimation of the drilling characteristic and a physical measurement of the drilling characteristic.

In some embodiments, the drilling anomaly detection system determines that the probability of a washout event (or other anomaly event) exceeds a threshold value. The drilling anomaly detection system may then activate a trigger to initiate a decrease in one or more drilling operation settings (e.g., the flow rate, the weight on the drill bit, or the standpipe pressure). For example, if the threshold value is 50%, the drilling anomaly detection system may activate the trigger upon determining that a washout event is more likely occurring than not.

The drilling anomaly detection system may generate a display of variables associated with the drilling operation. For instance, the drilling anomaly detection system may display on a graphical user interface the measurements of the drilling characteristic and the theoretical estimations of the drilling characteristic. As the measurement and theoretical estimation of the drilling characteristic are updated periodically, the drilling anomaly detection system may add the updates to the display on the graphical user interface. The drilling anomaly detection system may include an indication on the graphical user interface of a start of a drilling anomaly event. For example, the drilling anomaly detection system may mark a time on the display at which the determined probability of the drilling anomaly event first exceeded the threshold value. Additionally, or alternatively, the drilling anomaly detection system may add a textual notification or graphical icon on the display that indicates that the drilling anomaly event is likely occurring. The drilling anomaly detection system may issue a notification to a remote server or computing device that the drilling anomaly event is likely occurring.

In some embodiments, the drilling anomaly detection system receives and/or processes updates to some of the measurements and parameters described above. For example, the drilling anomaly detection system receives updates to the physical measurements at periodic time intervals. The drilling anomaly detection system may then use the updated physical measurements to update the estimates of the parameters for the physical model. The drilling anomaly detection system may likewise update the theoretical estimation of the drilling characteristic. The drilling anomaly detection system may then also update the probability that the drilling anomaly event is occurring.

As mentioned, the drilling anomaly detection system utilizes a drilling event classification neural network to determine probabilities that the drilling anomaly event is occurring. In some embodiments, the drilling event classification neural network comprises a long short-term memory neural network and one or more convolutional neural network layers. The drilling anomaly detection system provides the theoretical estimate of the drilling characteristic and the measurement of the drilling characteristic as inputs to the drilling event classification neural network, which processes the theoretical estimate of the drilling characteristic and the measurement of the drilling characteristic to generate the probability that the drilling anomaly event is occurring.

Also as mentioned, in some embodiments, the drilling anomaly detection system utilizes a convolutional neural network to generate estimations of the one or more parameters of the physical model. The drilling anomaly detection system provides the physical measurements as inputs to the convolutional neural network, which processes the physical measurements to generate the estimations of the one or more parameters.

The drilling anomaly detection system may also train the neural networks. For instance, the drilling anomaly detection system may train the drilling event classification neural network and/or the convolutional neural network utilizing a loss function. In some embodiments, the loss function includes a first term corresponding with classification of the drilling anomaly event, and a second term corresponding with estimating the parameters of the physical model. For example, the first term of the loss function may be a binary cross-entropy term and the second term of the loss function may be a mean squared error term. Each term may have an associated weight that represents an uncertainty value for that term. The loss function may further include a regularizing term.

The drilling anomaly detection system provides many advantages and benefits over conventional systems and methods. For example, by utilizing the drilling event classification neural network and the convolutional neural network in tandem with the physical model, the drilling anomaly detection system improves accuracy relative to conventional systems. Specifically, the drilling anomaly detection system reduces the incidence of false positive drilling anomaly predictions. This advantage yields the benefit that drilling operations undergo fewer errant system shutdowns that waste time, money, and opportunity.

Relatedly, the drilling anomaly detection system increases accuracy over conventional systems by decreasing the incidence of false negative drilling anomaly predictions. This advantage yields the benefit that drilling operators can make quicker decisions to slow down or shut down the drilling operation based on more accurate information, saving from costly tooling and equipment failures.

Another example advantage and benefit of the drilling anomaly detection system is increased flexibility and responsiveness over conventional systems. For instance, the drilling anomaly detection system reduces delay compared to conventional systems in determining that a drilling anomaly event is likely occurring, yielding an increased quickness of drilling operator response, thus saving tooling and equipment. Specifically, the disclosed drilling anomaly detection system can detect a drilling anomaly faster than conventional systems, which allows the drilling operator to make earlier decisions to reduce drilling inputs, or to partially or fully shut down the drilling operation in the wellbore. By making these decisions earlier, the drilling operator can minimize losses and save expensive tooling and equipment.

As illustrated by the foregoing discussion, the present disclosure utilizes a variety of terms to describe features and advantages of the drilling anomaly detection system. Additional detail is now provided regarding the meaning of such terms. For example, as used herein, the term "drilling anomaly event" refers to an irregularity, abnormality, or failure related to a drilling operation. In particular, the term "drilling anomaly event" can include a washout event. To illustrate, a drilling anomaly event can include drill string washout, wellbore washout, and other mechanical failures associated with subterranean drilling equipment.

The term "subterranean drilling equipment" refers to one or more devices or components used to perform drilling or exploration in a geological environment. In particular embodiments, subterranean drilling equipment can include devices or components for sensing, drilling, injecting, extracting, fracturing, tripping pipe, or other operation in relation to a drill well, a geological surface (or subsurface), an ocean/lake environment, or a subterranean reservoir. A few examples of subterranean drilling equipment include a traveling block, drill string, drill bit, Kelly drive, rotary table, standpipe, and mud pump.

The term "drilling characteristic" refers to a physical feature related to a drilling operation. In particular, the term "drilling characteristic" refers to a measurement or a theoretical estimation of a numerical metric associated with the drilling operation. For example, a drilling characteristic can include a standpipe pressure, a flow rate into a wellbore, a weight on a drill bit in the wellbore, a depth of the drill bit in the wellbore, block position, revolutions per minute, rate of penetration, etc.

The term "standpipe pressure" refers to a pressure at a standpipe of the wellbore. The standpipe pressure may be represented as a measurement of the standpipe pressure. Alternatively, the standpipe pressure may be represented as a theoretical estimation of the standpipe pressure. The term "flow rate into a wellbore" refers to a flow rate of a fluid into the wellbore. For example, the term "flow rate into a wellbore" can include a volumetric flow rate of drilling mud or drilling fluid into the wellbore. The term "weight on a drill bit in the wellbore" refers to a downward force exerted on a drill bit. For example, the term "weight on a drill bit in the wellbore" refers to the mechanical weight placed on a drill bit to provide a force to break through a rock formation. The term "depth of the drill bit in the wellbore" refers to a length dimension that the drill bit is located below a surface of the wellbore.

The term "physical model" refers to a representation of the physics governing a certain drilling characteristic in relation to other drilling characteristics. In particular, the term "physical model" is a mathematical relationship between one drilling characteristic and some other drilling characteristics. To illustrate, a physical model is an equation governing the standpipe pressure as a function of the flow rate into the wellbore, the weight on the drill bit in the wellbore, and the depth of the drill bit in the wellbore.

The term "parameters" refers to numerical values that define the physical model. In particular, the term "parameters" refers to mathematical constants or mathematical variables that govern the properties or features of the physical model. To illustrate, a parameter is a multiplier or exponent that operates on a drilling characteristic in the physical model to define the output of the physical model.

The term "theoretical estimation" refers to an analytical approximation of a drilling characteristic. In particular, the term "theoretical estimation" is the output of a physical model for estimating a drilling characteristic. For example, a theoretical estimation is non-measured approximation of a drilling characteristic, such as the standpipe pressure, based on the mathematical relationships defined in the physical model.

Reference will now be made in detail to embodiments, examples of which are illustrated in the accompanying drawings and figures. In the detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a drilling anomaly detection system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the drilling anomaly detection system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston, Texas), the INTERSECT™ reservoir simulator (Schlumberger Limited, Houston, Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results, and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures), or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the drilling anomaly detection system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

The present disclosure provides a hybrid solution (e.g., a hybrid model) to predict or detect a drill string washout. The drilling anomaly detection system 100 uses physical relations between the features of interest and a deep-learning architecture to estimate the probability of washout at one or more times. The features may be or include measurements of the flow rate, the weight on the drill bit (WoB), the depth of the drill bit, the standpipe pressure, or a combination thereof at predetermined intervals (e.g., every second) during the drilling. The drilling anomaly detection system 100 uses a neural network architecture (referred to as PhysicsNet). A custom loss function may be used to efficiently train the neural networks. A new set of metrics may be used to evaluate the performance of the solution generated by the neural networks. This approach to detecting a washout event may be based at least partially upon physical knowledge and the use of multi-task loss. In experiments, this new system provided four times fewer false detection spikes than the conventional pure deep learning method.

During drilling, many different types of anomalies may occur, such as a washout event, involving the presence of holes and/or cracks in the drill string. The holes and/or cracks may be caused by corrosion or tensile stress. This may cause damage to the drill pipe, which may potentially lead to the wellbore being abandoned.

Figure 2A:
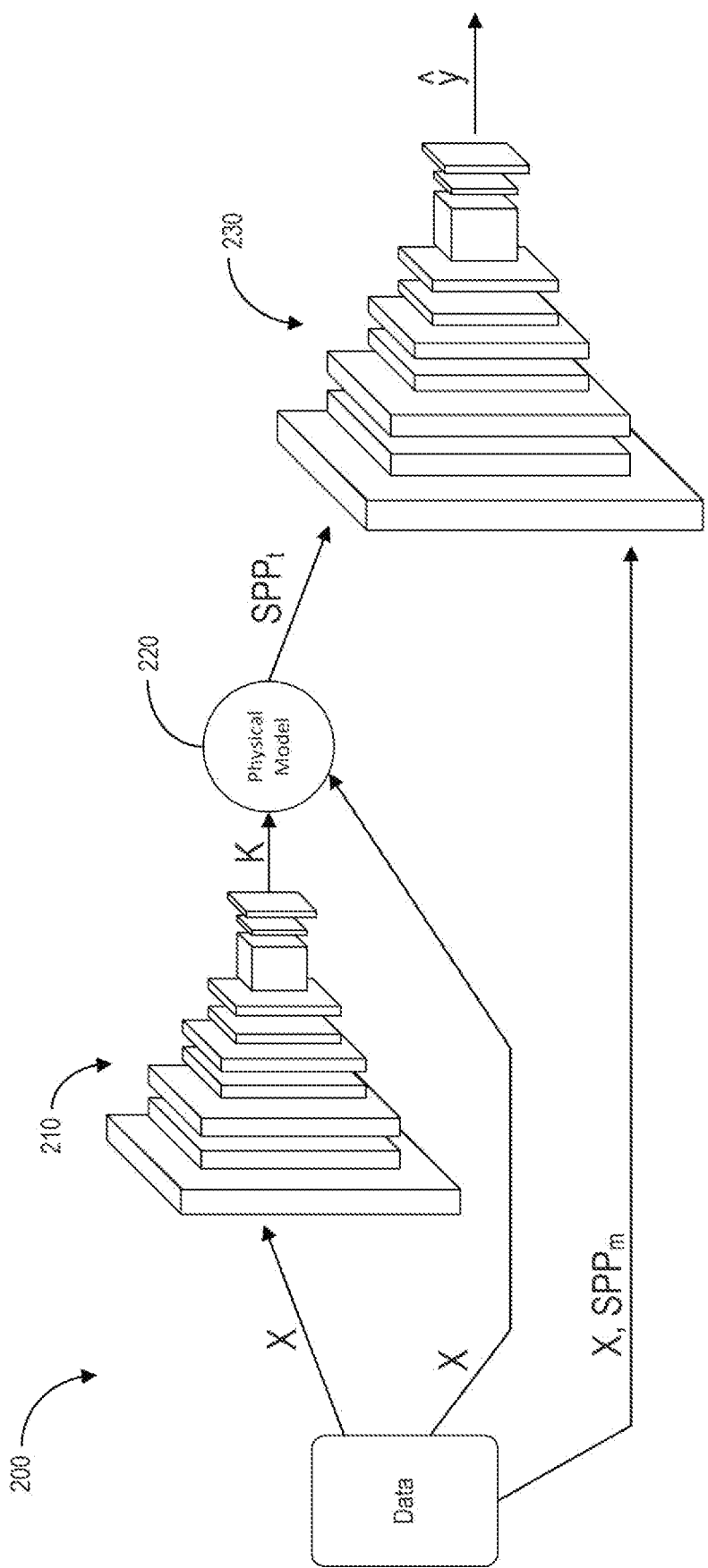
FIG. 2A illustrates a schematic diagram of an architecture of a hybrid neural network in accordance with one or more embodiments.

As discussed above, the drilling anomaly detection system 100 can detect drilling anomaly events utilizing a neural network and a physical model. For instance, FIG. 2A illustrates a schematic view of an architecture of a hybrid neural network 200 utilized by the drilling anomaly detection system 100 in accordance with one or more embodiments. Specifically, FIG. 2A shows that the hybrid neural network 200 includes a parameter-estimation convolutional neural network 210, a physical model 220, and a drilling event classification neural network 230. Additionally, FIG. 2A shows the flow of data to and from these components of the hybrid neural network 200, which is described in greater detail below. The remaining figures are directed to an embodiment in which the drilling anomaly event comprises a washout event. One will appreciate in light of the disclosure herein that other embodiments include determining other drilling anomalies. Thus, while the remaining description focuses on determining whether a washout event is occurring, one of ordinary skill in the art will appreciate in light of the disclosure herein that the present invention is not so limited. Indeed, a hybrid neural network, as described herein below, can receive other measurements as input, utilize another physical model, to determine another drilling anomaly, such as for example, whether a stuck pipe event is occurring. A stuck pipe event can occur when a drill string or other drilling equipment gets stuck in a wellbore. As additional examples, drilling anomaly events can include rig non-productive time, bit trip, twist off, mud motor failure, rotary steerable systems failure, measurement while drilling failure, surface waiting, wellbore instability, downhole tool failure, tight hole, influx, stuck pipe, gas, lost circulation, and the like.

In any event, the drilling anomaly detection system 100 can receive data, which includes physical measurements X related to the wellbore. The physical measurements X can include a measurement of flow rate into the wellbore, a measurement of weight on the drill bit in the wellbore, a measurement of depth of the drill bit in the wellbore, and/or a measurement of standpipe pressure associated with the wellbore, etc. The physical measurements may be captured by one or more sensors at the wellsite and received by the drilling anomaly detection system 100 from the sensors. The measurements may be captured continuously or at predetermined intervals (e.g., every second, minute, etc.). In some embodiments, the drilling anomaly detection system 100 performs the measurements, thereby physically measuring the physical measurements X. In this disclosure, "receiving physical measurements" is contemplated to include "physically measuring the physical measurements."

As shown in FIG. 2A, the drilling anomaly detection system 100 feeds at least some of the physical measurements X through a parameter-estimation convolutional neural network 210. As described further below in connection with FIG. 2B, the drilling anomaly detection system 100 utilizes the parameter-estimation convolutional neural network 210 to estimate one or more parameters K of a physical model 220 based at least partially on the plurality of physical measurements X.

The drilling anomaly detection system 100 passes the estimated parameters K to the physical model 220. In particular, the drilling anomaly detection system 100 utilizes the physical model 220 to define the physical relationships between the various drilling characteristics. The drilling anomaly detection system 100 also feeds at least some of the physical measurements X through the physical model 220. In particular, the drilling anomaly detection system 100 utilizes the physical model 220 to determine a theoretical estimation of the drilling characteristic (e.g., standpipe pressure $SPP_t$). The drilling anomaly detection system 100 determines the theoretical estimation of the standpipe pressure $SPP_t$ based on the physical model 220 using the plurality of physical measurements X and the estimated one or more parameters K determined utilizing the parameter-estimation convolutional neural network 210.

The physical model 220 may be an arithmetic formula for determining the theoretical estimation of the standpipe pressure $SPP_t$. For example, the drilling anomaly detection system 100 utilizes the physical model 220 to multiply or exponentiate some of the physical measurements X with certain of the parameters K. For instance, the drilling anomaly detection system 100 may determine the theoretical estimation of the standpipe pressure $SPP_t$ utilizing the physical model 220 by multiplying the measurement of the depth of the drill bit with a first parameter of the one or more parameters, exponentiating the measurement of the flow rate by raising the measurement of the flow rate to a power of a second parameter of the one or more parameters, and multiplying the measurement of the weight on the drill bit with a third parameter of the one or more parameters. This example the physical model 220 is represented by the following algorithm:

$$SPP_t = (k_0 + k_1 \times BD) \times FR^{k_2} + k_3 \times WOB$$

where $k_0$, $k_1$, $k_2$, and $k_3$ are zeroth, first, second, and third parameters of the one or more parameters K, respectively, and where BD is the depth of the drill bit, FR is the flow rate, and WOB is the weight on the drill bit.

The drilling anomaly detection system 100 feeds the theoretical estimation of the standpipe pressure $SPP_t$ through the drilling event classification neural network 230. Additionally, the drilling anomaly detection system 100 feeds at least some of the physical measurements X, including a measurement of the standpipe pressure $SPP_m$, through the drilling event classification neural network 230. The drilling anomaly detection system 100 utilizes the drilling event classification neural network 230 to determine a probability $\hat{y}$ that a drilling anomaly event, such as a drill string washout, is occurring. The drilling anomaly detection system 100 bases the determination of the probability $\hat{y}$ of a drilling anomaly event on the theoretical estimation of the standpipe pressure $SPP_t$ and the measurement of the standpipe pressure $SPP_m$.

As shown by FIG. 2A, the hybrid neural network 200 utilizes physics theory knowledge (e.g., via the physical model) to guide a machine learning workflow to determine a solution for detecting drilling anomaly events. In other words, the hybrid neural network 200 accurately detects a drilling anomaly event from real-time field measurements by leveraging the strengths of a theoretical approach and a machine learning approach. In particular, the hybrid neural network 200 is a multi-tasking physics informed neural network. The hybrid neural network 200 performs both a physical parameter estimation task and a classification task. Furthermore, the drilling anomaly detection system 100 determines a balance between these two tasks to improve performance and accuracy of the hybrid neural network 200.

More specifically, by utilizing the hybrid neural network 200 to perform two different but related tasks, the drilling anomaly detection system 100 is able to utilize multitask learning to improve performance of the individual tasks. In other words, the drilling anomaly detection system 100 is able to more accurately estimate the parameters K and the classification $\hat{y}$ that a system with separate machine learning models for each task. In particular, by training on related tasks, the drilling anomaly detection system 100 is able to utilize the hybrid neural network 200 to develop a shared representation, which learns from one task to improve the other. Indeed, by utilizing the hybrid neural network 200 to perform two different but related tasks, the drilling anomaly detection system 100 is able to perform each task more accurately than conventional systems that utilize separate models to perform each task individually.

The Neural Networks

As mentioned above, the present disclosure is directed to a hybrid model, involving physical knowledge and deep-learning neural networks. The neural networks are described in view of the following points: the system architecture, the loss used to train the neural networks, and the designed metrics. As described in further detail in connection with FIGS. 2B and 2C, the architecture of both neural networks begins with a few blocks of convolutional layers and max-pooling to extract the features of interest. After these blocks, to fulfill the first task of estimating the parameters K, one or more fully connected layers are provided. For the classification task, a long short-term memory (LSTM) recurrent neural network (RNN) may be provided between the convolutional blocks and the fully connected layers.

The Architecture

The drilling anomaly detection system 100 includes the parameter-estimation convolutional neural network 210, which estimates parameters K of the physical model 220 using measurements X as inputs. Once the parameters K are obtained, a theoretical estimation of a standpipe pressure $SPP_t$ may be determined using the physical model 220, with the parameters K and the measurements X as inputs. The drilling event classification neural network 230 performs classification to determine a probability $\hat{y}$ that a drilling anomaly event is occurring. The drilling event classification neural network 230 uses the theoretical estimation of the standpipe pressure $SPP_t$, a measurement of the standpipe pressure $SPP_m$, and the measurements X as inputs.

Figure 2B:
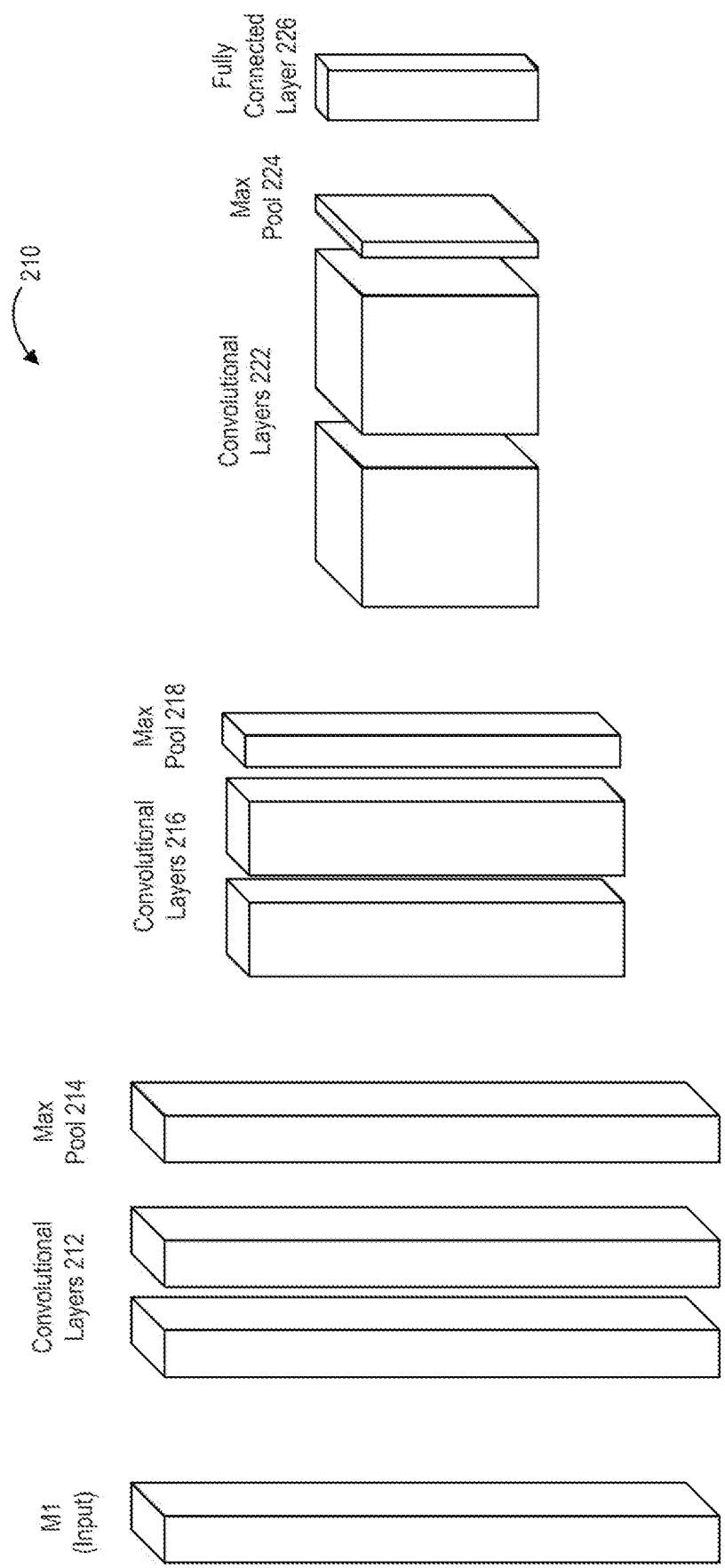
FIG. 2B illustrates a schematic diagram of an architecture of a parameter-estimation convolutional neural network for predicting or estimating one or more parameters of a physical model, in accordance with one or more embodiments.

As mentioned, in some embodiments, the parameter-estimation convolutional neural network 210 comprises convolutional layers and max-pooling layers. For example, FIG. 2B illustrates the parameter-estimation convolutional neural network 210 according to some embodiments. The parameter-estimation convolutional neural network 210 has an input layer and one or more convolutional layers. The convolutional layers are followed by max-pooling layers.

In one or more implementations, the drilling anomaly detection system 100 concatenates the measurements X into an input M1. The drilling anomaly detection system 100 processes the concatenated measurements X with a first set of convolutional layers 212 of the parameter-estimation convolutional neural network 210 to generate a first set of latent features that are combined utilizing a first max-pooling operation 214. In one or more implementations, a set of latent features includes a set of values corresponding to latent and/or patent attributes and characteristics of an input analyzed by a neural network. The drilling anomaly detection system 100 processes the pooled first set of latent features utilizing a second set of convolutional layers 216 of the parameter-estimation convolutional neural network 210 to generate a second set of latent features that are combined utilizing a second max-pooling operation 218. The drilling anomaly detection system 100 processes the pooled second set of latent features utilizing a third set of convolutional layers 222 of the parameter-estimation convolutional neural network 210 to generate a third set of latent features that are combined utilizing a third max-pooling operation 224. The drilling anomaly detection system 100 utilizes one or more fully connected layers 226 to generate estimated parameters K from the pooled third set of latent features.

Figure 2C:
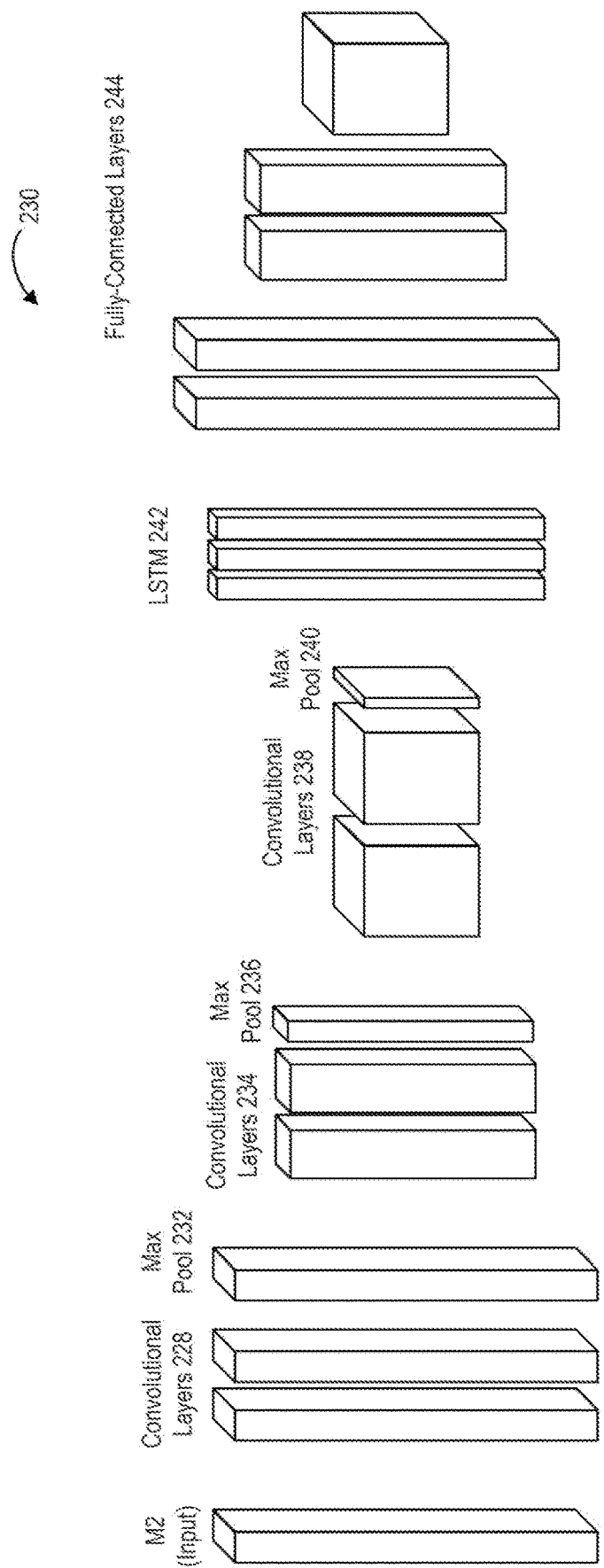
FIG. 2C illustrates a schematic diagram of an architecture of a drilling event classification neural network for determining probabilities of drilling anomaly events, in accordance with one or more embodiments.

FIG. 2C illustrates the drilling event classification neural network 230 according to some embodiments. The drilling event classification neural network 230 has an input layer, one or more hidden convolutional layers followed by max-pooling layers, a long short-term memory network, and fully connected layers. As used herein, the term "long short-term memory neural network" (or "LSTM network") refers to a neural network that is a special type of recurrent neural network (RNN). An "LSTM network" includes a cell having an input gate, an output gate, and a forget gate as well as a cell input. In various embodiments, the cell remembers previous states and values over time (including hidden states and values) and the three gates control the amount of information that is input and output from a cell. In many embodiments, an LSTM network includes various cells.

In one or more implementations, the drilling anomaly detection system 100 concatenates the theoretical estimation of the standpipe pressure $SPP_t$, a measurement of the standpipe pressure $SPP_m$, and the measurements X into an input M2. The drilling anomaly detection system 100 processes the input M2 with a first set of convolutional layers 228 of the drilling event classification neural network 230 to generate a first set of latent features that are combined utilizing a first max-pooling operation 232. The drilling anomaly detection system 100 processes the pooled first set of latent features utilizing a second set of convolutional layers 234 of the drilling event classification neural network 230 to generate a second set of latent features that are combined utilizing a second max-pooling operation 236. The drilling anomaly detection system 100 processes the pooled second set of latent features utilizing a third set of convolutional layers 238 of the drilling event classification neural network 230 to generate a third set of latent features that are combined utilizing a third max-pooling operation 240. The drilling anomaly detection system 100 utilizes pooled third set of latent features as input to an LSTM 242. The drilling anomaly detection system 100 utilizes the LSTM 242 to process a series of pooled third set of latent features for different time steps. The drilling anomaly detection system 100 utilizes the LSTM 242 to generate a hidden feature vector. The drilling anomaly detection system 100 utilizes one or more fully connected layers 244 (e.g., a softmax classifier layer) to generate a probability $\hat{y}$ that a drilling anomaly event is occurring.

The Loss Function

In some embodiments, the drilling anomaly detection system 100 utilizes a loss function to guide the training of the hybrid neural network 200 and its sub-networks (e.g., the parameter-estimation convolutional neural network 210 and the drilling event classification neural network 230). As used herein, the term "loss function" or "loss model" refers to a function that indicates training loss. In some embodiments, a machine-learning algorithm can repetitively train to minimize total overall loss. As used herein, joint training (or joint learning) refers to tuning parameters of multiple learning models together. In particular, joint training (or learning) includes solving a plurality of learning tasks at the same time while utilizing the roles and constraints across the tasks. For example, the deep learning attribution system can employ joint learning to simultaneously train and tune the parameters of the sub-networks networks (e.g., the parameter-estimation convolutional neural network 210 and the drilling event classification neural network 230) of the hybrid neural network 200 together.

The loss function may be selected to help the drilling anomaly detection system 100 fulfill its role. The drilling anomaly detection system 100 utilizes the hybrid neural network 200 to complete two tasks as mentioned above. The first task is to output a reliable theoretical estimation of the standpipe pressure. The second task is to provide a probability of washout or other drilling anomaly. To do so, the drilling anomaly detection system 100 uses a multi-task loss function to train the hybrid neural network 200 to detect the washout and to provide the theoretical standpipe pressure close to the measured value. By teaching hybrid neural network 200 to estimate the correct physical model parameters, the drilling anomaly detection system 100 helps the hybrid neural network 200 to identify irregularities in the SPP behavior; thus, the hybrid neural network 200 becomes more efficient in the classification task.

The drilling anomaly detection system 100 utilizes an objective loss function is given by the following equations:

$$L(y, \hat{y}, SPP_t, SPP_m) = \frac{1}{\sigma_1^2} L_1(y, \hat{y}) + \frac{1}{2\sigma_2^2} L_2(SPP_t, SPP_m; y) + \log \sigma_1 \sigma_2$$

where $$L_1(y, \hat{y}) = BCE(y, \hat{y}) = -(y \log \hat{y} + (1-y) \log (1-\hat{y}))$$

and $$L_2(SPP_t, SPP_m; y) =$$

$$(1-y) \times MSE(SPP_t, SPP_m) = (1-y)\frac{\|SPP_t - SPP_m\|_2^2}{n}.$$

$SPP_t$ is the theoretical estimation of the standpipe pressure, $SPP_m$ is the measurement of the standpipe pressure, y is the ground truth label, $\hat{y}$ the prediction of the drilling anomaly detection system 100, and $\sigma_1$ and $\sigma_2$ are statistical variances used as weights related to the uncertainties of the tasks.

The drilling anomaly detection system 100 utilizes binary cross entropy (BCE) loss to train the drilling event classification neural network 230 for the classification task. The drilling anomaly detection system 100 utilizes the mean squared error (MSE) to train the parameter-estimation convolutional neural network 210 to learn reliable parameters for the physical model. The (1−y) factor in the term with the mean squared error allows the physical model 220 to be learned on the non-washout part of the run. In other words, the drilling anomaly detection system 100 utilizes the loss function to set the term with the mean squared error to null during a ground truth anomaly event. By nullifying the mean squared error term during a ground truth anomaly event, the drilling anomaly detection system 100 utilizes the loss function to ensure that the physical model 220 learns only during the non-washout portion of training, which enhances the accuracy of the physical model 220. The third term in the objective loss function (log $\sigma_1\sigma_2$) is a regularizing term that prevents the neural networks from continuously increasing the uncertainty weights.

Because the main task is to detect of washout events, the drilling anomaly detection system 100 improves reliability of the model by including physical knowledge into the hybrid neural network 200, in order to penalize nonphysical consistent results. However, because the performance of a multitasking machine learning model depends on the choice of the weights associated with each task's loss, the drilling anomaly detection system 100 utilizes an efficient method to adapt the relative weights in the loss function. In particular, the drilling anomaly detection system 100 creates a probabilistic framework in which the likelihood of the classification label follows a Gaussian distribution centered on the network output with a variance of $\sigma_2$. In so doing, the drilling anomaly detection system 100 creates a multitasking loss function that aims at maximizing the Gaussian likelihood.

During the training of the network, the drilling anomaly detection system 100 modifies the weights/parameters of the hybrid neural network 200 may be modified (e.g., optimized) using the loss defined above. By computing its gradient and doing the back-propagation, the weights of the neural networks and the uncertainty related to the tasks ($\sigma_1$ and $\sigma_2$) may be updated.

The Metrics

To assess the performance of the drilling anomaly detection system 100, some relevant metrics may be defined. For a run with a washout event, two parts are identified: the non-washout part, and the part with washout. For the non-washout side, the following metrics may be used:

$l_{score} = 1 - \int_{t \in W^c} \hat{y}(t) w_l(t) dt$

For the washout side, the following metrics may be used:

$r_{score} = \int_{t \in W} \hat{y}(t) w_r(t) dt$

The output of the network is $\hat{y}$, W denotes the set of times t when the washout is occurring, and $w_l$ and/or $w_r$ are weights profiles. These weight profiles help to increase the penalty when the neural networks make a mistake far from the start of the washout. The metrics may be aggregated to employ an overarching metric F1 score, according to the following equation:

$$F1_{score} = \frac{2 l_{score} r_{score}}{l_{score} + r_{score}}.$$

The F1 score may alternatively be determined according to the following equation:

$$F1_{score} = \frac{2 \cdot recall \cdot precision}{recall + precision},$$

where recall is the fraction of positives that are correctly classified, and precision is the number of true positives divided by the total number of positive predictions.

The Workflow

The workflow to actually detect these washout events with the drilling anomaly detection system 100 follows the steps: (1) prepare the samples given the measurements that have been collected, (2) train the neural networks, and (3) generate an inference based on the data.

Prepare the Samples from the Measurements

The measurements may be or include a set of 1-D signals with one signal per feature. The signals may be transformed into trajectories. Each sample brought to the neural networks may include one or more (e.g., four) features of a predetermined length. This means that, to output the probability of washout at time t, the sample contains every measurement acquired during a certain period of time prior to t. The washout may be visible as a decreasing trend of the standpipe pressure. The previous measurements may help the network to identify such an event.

Train the Networks

To train the neural networks, one or more augmented cases of washout events may be used. They may be obtained from a dataset containing measurements from clean runs (i.e., runs without drill string washout), and a synthetic washout may be applied to these runs.

One part of these examples may be used for the training, and another (e.g., smaller) part for the validation. The train/validation split may be done at the runs level so the validation metrics may be computed on unseen runs.

At the beginning of the training, the validation samples are generated using the augmentation function and may remain the same during the training. At each epoch, a new set of training samples is generated so that the neural networks can see various examples of washout.

Results

Figures 3, 4:
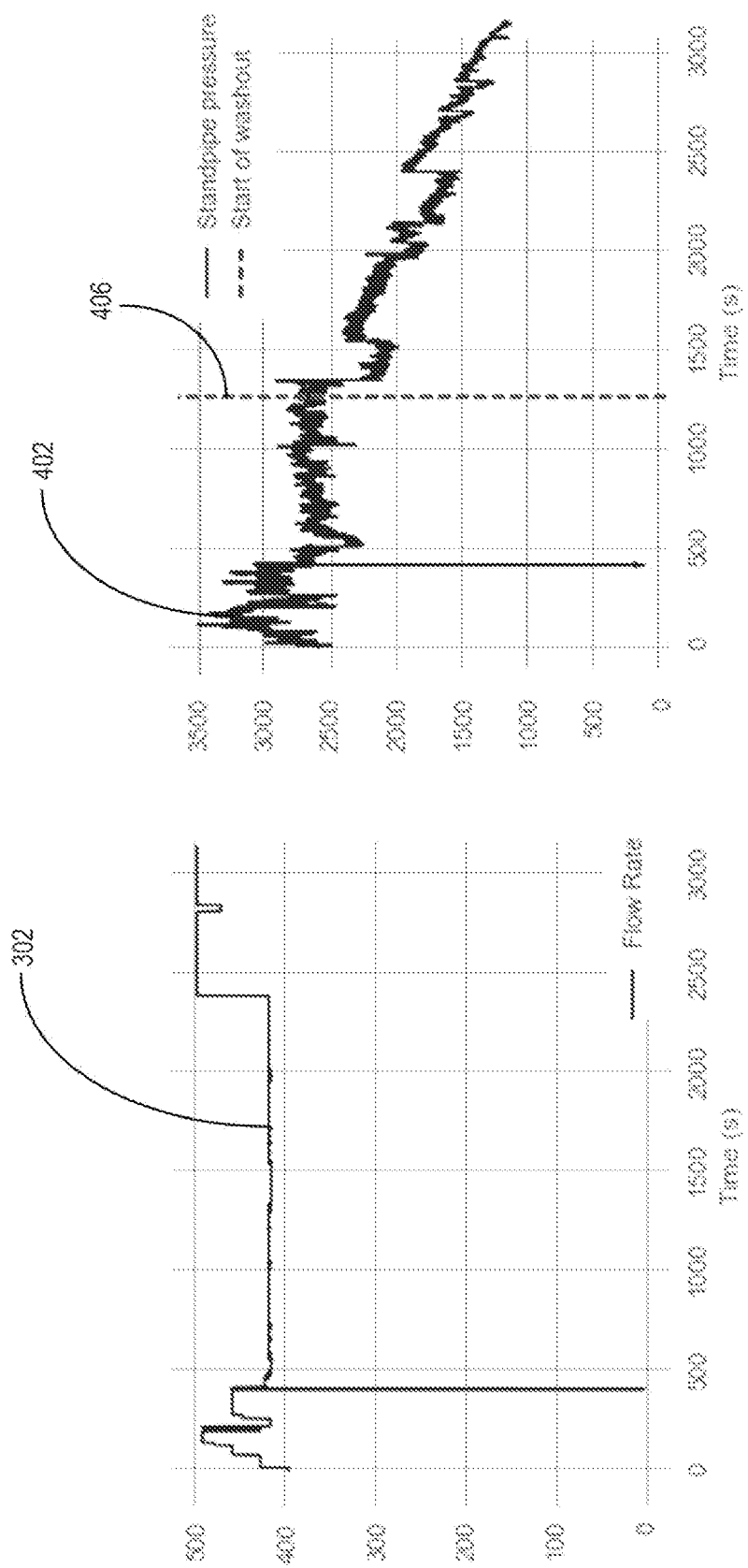
FIG. 3 illustrates a graph showing flow rate during a drill string washout event, in accordance with one or more embodiments.
FIG. 4 illustrates a graph showing standpipe pressure during a drill string washout event, in accordance with one or more embodiments.

As discussed above, the drilling anomaly detection system 100 can accurately detect a washout event, such as drill string washout. FIGS. 3 and 4 illustrate data of a drilling operation during a drill string washout event, in accordance with one or more embodiments. Specifically, FIG. 3 shows a plot of flow rate 302 of drilling fluid into a wellbore, and FIG. 4 shows a plot of the standpipe pressure 402 at the wellbore.

The flow rate 302, the standpipe pressure 402, or both may be used to detect a washout event. In the example shown in FIGS. 3 and 4, the standpipe pressure 402 starts to decrease in a continuous manner starting at about 1300 seconds and continuing until the end of the drilling. In some embodiments, a washout event can be detected when the flow rate 302 remains at a constant level while the standpipe pressure 402 decreases. The drilling anomaly detection system 100 can indicate a start 406 of the washout event on a display, as shown in FIG. 4.

Experiments were conducted to determine how well the drilling anomaly detection system 100 compares with a purely data-driven approach. To assess the performance of the drilling anomaly detection system 100, the drilling anomaly detection system 100 was cross-validated with a pure data-driven model without physical knowledge. The experiments accounted for the accuracy of the models, the precision (number of true positives divided by the total number of positive predictions), the recall (fraction of positives that are correctly classified), and the F1 score.

Results of the experiments are shown in the following table. The purely data-driven approach produced an F1 score of 0.79, whereas the drilling anomaly detection system 100 achieved an F1 score of 0.84. This clear improvement over the purely data-driven approach is attributable at least in part due to the hybrid combination of the physical model 220 with the neural networks 210, 230, as well as the multitask learning functionality of the loss function. The relative weights in the loss function (the uncertainties based on statistical variances) enhance the multitask learning by providing various training considerations while balancing multiple tasks.

| Approach | Accuracy | Precision | Recall | F1 Score |
| --- | --- | --- | --- | --- |
| Purely data-driven approach | 92.2 | 75.3 | 89.7 | 79.3 |
| Drilling anomaly detection system 100 | 93.9 | 84.9 | 88.3 | 84.4 |

Inference on the Data

At each predetermined time period (e.g., each second) during the drilling, the measurements may be transformed into samples by following the steps described in the previous section. This sample may then be given as input to the drilling anomaly detection system 100. The drilling anomaly detection system 100 may estimate the parameters of the physical model for this run, compute the theoretical estimation of the standpipe pressure, and concatenate this value to the measurements before sending this information to the drilling event classification neural network 230. In the end, the drilling anomaly detection system 100 may output, at each time, a probability of washout, as shown in FIGS. 5 and 6.

In this way, the drilling anomaly detection system 100 may update, at periodic time intervals, the various measurements, estimates, and drilling characteristics. For example, at periodic time intervals (such as each second), the drilling anomaly detection system 100 receives updates to the plurality of physical measurements X related to the wellbore. The drilling anomaly detection system 100 can update the estimations of the one or more parameters K of the physical model 220. In some embodiments, the drilling anomaly detection system 100 keeps the estimations of the parameters K of the physical model 220 constant, rather than periodically updating the parameters K. The drilling anomaly detection system 100 can determine updates to the theoretical estimation of the standpipe pressure $SPP_t$ based on the physical model 220 using the updates to the plurality of physical measurements X and the estimated one or more parameters K. Similarly, the drilling anomaly detection system 100 can determine updates to the probability $\hat{y}$ that the drilling anomaly event is occurring.

To illustrate results of the updates made by the drilling anomaly detection system 100, FIG. 5 shows a display of a graph of measurements 502 of the standpipe pressure ($SPP_m$) compared with outputs 504 of the physical model 220 (e.g., theoretical estimations of the standpipe pressure $SPP_t$), according to an embodiment. The display of FIG. 5 also shows a start 506 of the drilling anomaly event. For example, the drilling anomaly detection system 100 indicates a start 506 of the washout event to indicate to a user that the washout is occurring.

FIG. 6 shows a display of a graph of the prediction 602 of the drilling anomaly detection system 100 (e.g., probabilities $\hat{y}$ that a drilling anomaly event is occurring) versus a ground truth, according to an embodiment.

Use in the Field

Figure 7A:
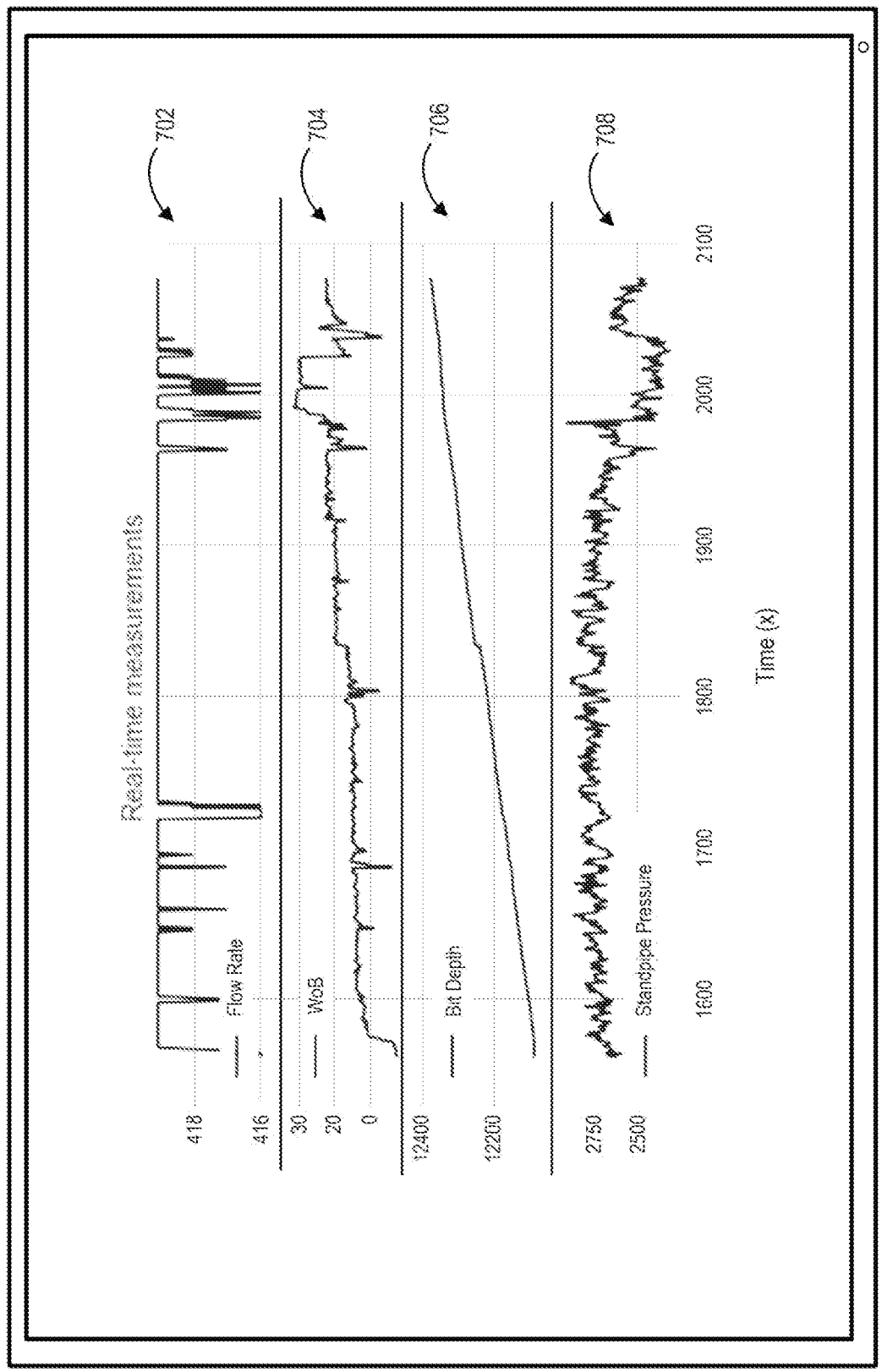
FIG. 7A illustrates graphs generated during live (e.g., real-time) monitoring of a washout event, in accordance with one or more embodiments. More particularly.
Figure 7B:
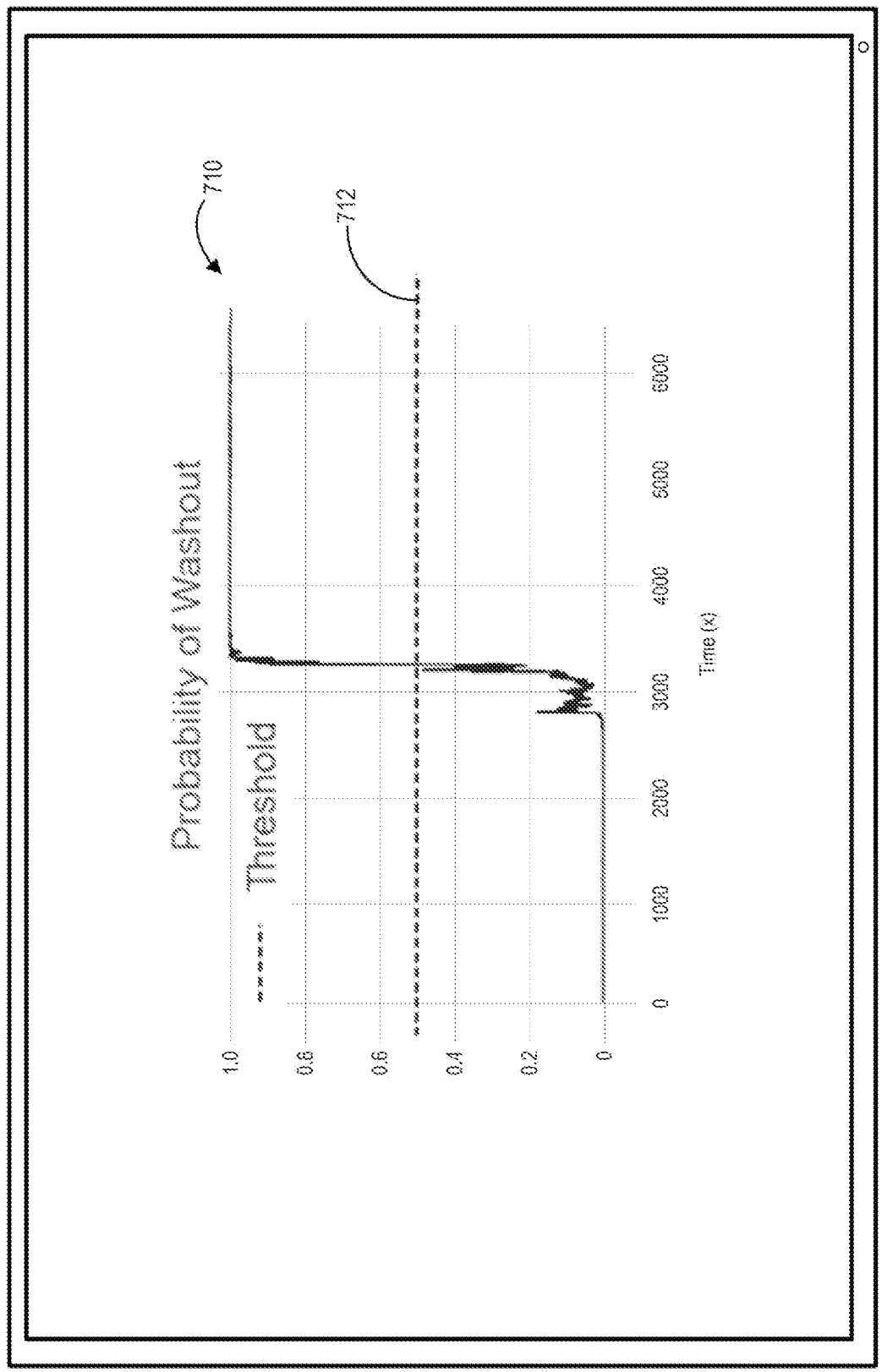
FIG. 7B illustrates graphs generated during live (e.g., real-time) monitoring of a washout event, in accordance with one or more embodiments. More particularly.

The drilling anomaly detection system 100 may be used in the field to monitor real washout events and/or other drilling anomaly events. During the drilling, the features of interest may be collected, transformed into samples, and given in the input of the drilling anomaly detection system 100. This may be repeated in a recurring process, such as at periodic time intervals. The drilling anomaly detection system 100 may then output the probability of the washout event in real-time, and the operator may monitor this probability. An example of this is shown in FIGS. 7A and 7B. More particularly, FIG. 7A shows a graphical user interface, on which the drilling anomaly detection system 100 generates a display of measurements of the flow rate 702, the weight on the drill bit (WoB) 704, the depth of the drill bit 706, and the standpipe pressure 708 over the time of a drilling operation.

FIG. 7B shows a graphical user interface, on which the drilling anomaly detection system 100 generates a display of the probability 710 of a washout event over the time of the drilling operation. The graphical user interface of FIG. 7B also displays an indication 712 on the graphical user interface of a threshold probability of washout. In some embodiments, a notification is generated and sent to a drilling operator in the event that the probability that a washout event is occurring exceeds the threshold.

In some embodiments, a trigger is activated in response to a determination that the probability of the washout event exceeds the threshold value. The trigger may initiate a decrease in the flow rate, a decrease of the weight on the drill bit, or a decrease in the standpipe pressure. For example, the trigger may cause the flow of drilling fluid to decrease or stop, thereby decreasing the flow rate.

Figure 8:
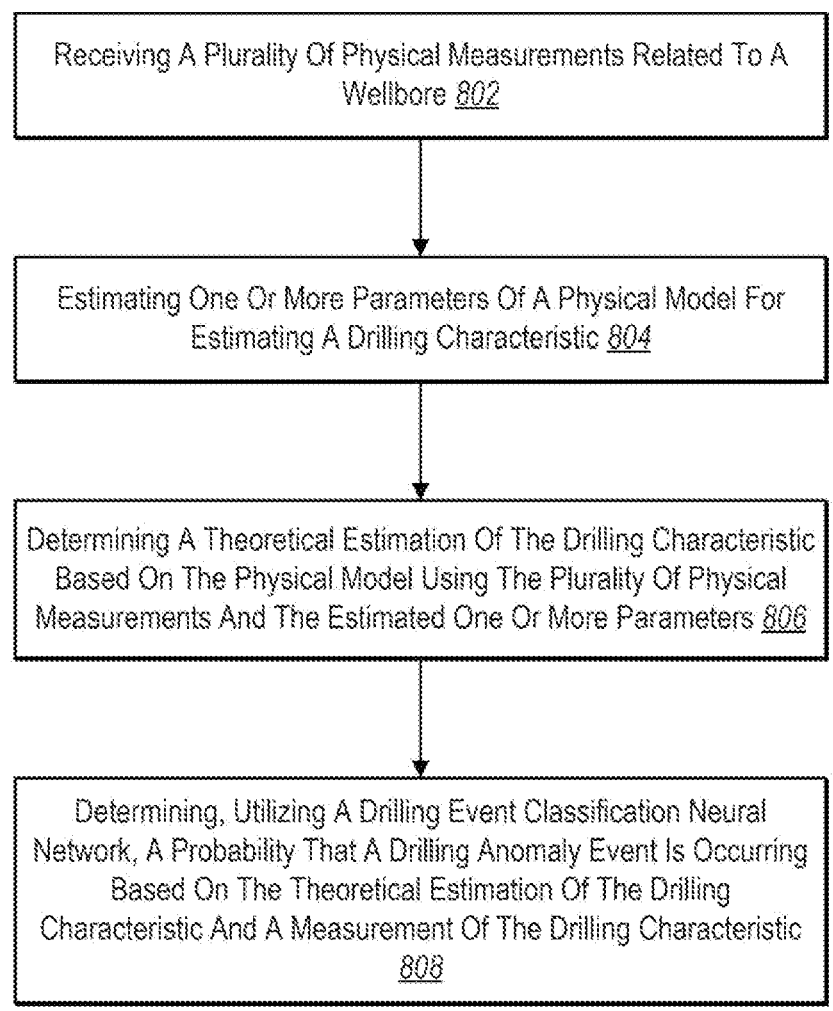
FIG. 8 illustrates a flowchart of a series of acts for detecting a drilling anomaly in accordance with one or more embodiments.

FIGS. 1-7, the corresponding text, and the examples provide a number of different methods, systems, devices, and non-transitory computer-readable media of the drilling anomaly detection system 100. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for detecting a drilling anomaly in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 for receiving a plurality of physical measurements related to a wellbore. In particular, the act 802 can include receiving a measurement of a flow rate into the wellbore, a measurement of a weight on a drill bit in the wellbore, and a measurement of a depth of the drill bit in the wellbore.

More particularly, the act 802 can include physically measuring the flow rate into the wellbore, the weight on the drill bit in the wellbore, and the depth of the drill bit in the wellbore. The act 802 can further include receiving, at periodic time intervals, updates to the plurality of physical measurements related to the wellbore.

As further shown in FIG. 8, the series of acts 800 includes an act 804 for estimating one or more parameters of a physical model for estimating a drilling characteristic. In particular, the act 804 can be based at least partially upon the plurality of physical measurements. Specifically, the act 804 can include utilizing a convolutional neural network to generate estimations of the one or more parameters. The act 804 can include estimating the one or more parameters of the physical model by processing the plurality of physical measurements through a convolutional neural network to generate estimations of the one or more parameters. The act 804 can further include updating, at the periodic time intervals and based at least partially upon the updates to the plurality of physical measurements, estimations of the one or more parameters of the physical model for estimating the drilling characteristic.

As also shown in FIG. 8, the series of acts 800 includes an act 806 for determining a theoretical estimation of the drilling characteristic. In particular, the act 806 can be based on the physical model using the plurality of physical measurements and the estimated one or more parameters. Specifically, the act 806 can include determining a theoretical estimation of a standpipe pressure. The act 806 can further include multiplying the measurement of the depth of the drill bit with a first parameter of the one or more parameters, exponentiating the measurement of the flow rate by raising the measurement of the flow rate to a power of a second parameter of the one or more parameters, and multiplying the measurement of the weight on the drill bit with a third parameter of the one or more parameters. The act 806 can additionally include determining, at the periodic time intervals, updates to the theoretical estimation of the drilling characteristic based on the physical model using the updates to the plurality of physical measurements and the estimated one or more parameters.

As additionally shown in FIG. 8, the series of acts 800 includes an act 808 for determining a probability that a drilling anomaly event is occurring. In particular, the act 808 can include utilizing a drilling event classification neural network. The drilling event classification neural network can include a long short-term memory neural network and one or more convolutional neural network layers. The act 808 can be based on the theoretical estimation of the drilling characteristic and a measurement of the drilling characteristic. Specifically, the act 808 can include determining a probability of a washout event. Alternatively, or additionally, the act 808 can include determining a probability of a stuck pipe event. More particularly, the act 808 can include physically measuring the drilling characteristic. The act 808 can further include training the drilling event classification neural network utilizing a loss function comprising a binary cross-entropy term weighted according to a first uncertainty, a mean squared error term weighted according to a second uncertainty, and a regularizing term. The act 808 can additionally include nullifying the mean squared error term during a ground truth anomaly event. The act 808 can also include receiving, at the periodic time intervals, updates to the measurement of the drilling characteristic. The act 808 can further include determining, at the periodic time intervals and utilizing the drilling event classification neural network, updates to the probability that the drilling anomaly event is occurring based on the updates to the theoretical estimation of the drilling characteristic and the updates to the measurement of the drilling characteristic.

The series of acts 800 can further include activating a trigger in response to determining that the probability of the washout event exceeds a threshold value, wherein the trigger initiates one or more of a decrease in the flow rate, a decrease of the weight on the drill bit, or a decrease in the standpipe pressure. The series of acts 800 can further include generating, via a graphical user interface, a display of one or more of the measurement of the drilling characteristic or the theoretical estimation of the drilling characteristic and indicating a start of the drilling anomaly event on the display. The series of acts 800 can additionally include generating, at the periodic time intervals and via the graphical user interface, a display of one or more of the updates to the theoretical estimation of the drilling characteristic or the updates to the measurement of the drilling characteristic, and indicating a start of the drilling anomaly event on the display. The series of acts 800 can include training the drilling event classification neural network utilizing a loss function comprising a binary cross-entropy term weighted according to a first uncertainty. Also, the series of acts 800 can include training the convolutional neural network utilizing the loss function, wherein the loss function further comprises a mean squared error term weighted according to a second uncertainty.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
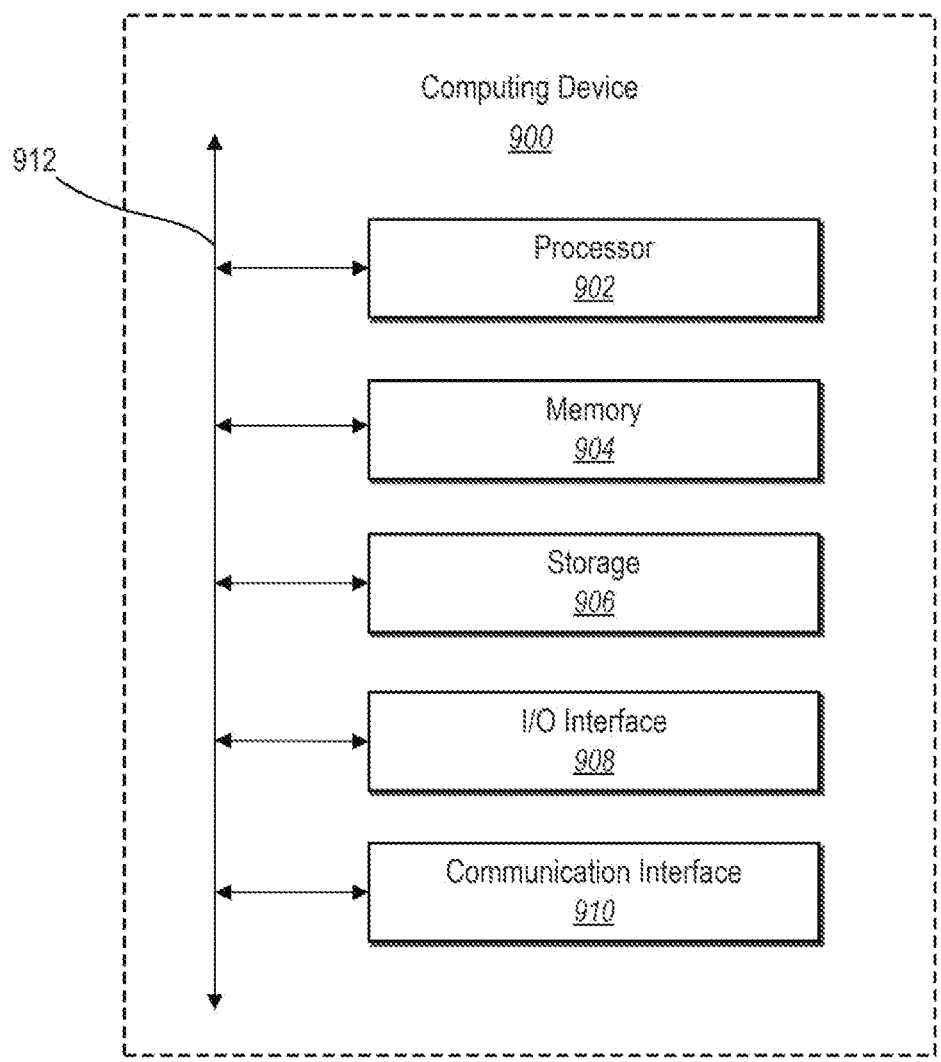
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., processing component 116, simulation component 120, or other components of the management components 110 or of the framework 170). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known 110 devices or a combination of such 110 interfaces 908. The touch screen may be activated with a stylus or a finger.

The 110 interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, 110 interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method for detecting a drilling anomaly, the method comprising:
   receiving a plurality of physical measurements related to a wellbore, wherein the plurality of physical measurements include a flow rate measurement of a flow rate of drilling fluid into the wellbore, a weight on bit (WOB) measurement of a weight on a drill bit in the wellbore, and a depth measurement of the drill bit in the wellbore;
   based at least partially upon the plurality of physical measurements, estimating a plurality of estimated parameters of a physical model for estimating a drilling characteristic;
   determining a theoretical estimation of the drilling characteristic based on the physical model using the plurality of physical measurements and the plurality of estimated parameters, wherein determining the theoretical estimation includes:
      multiplying the depth measurement with a first parameter of the plurality of estimated parameters;
      exponentiating the flow rate measurement by raising the flow rate measurement to a power of a second parameter of the plurality of estimated parameters; and
      multiplying the WOB measurement with a third parameter of the plurality of estimated parameters;
   determining, utilizing a drilling event classification neural network, an anomaly probability that a drilling anomaly event is occurring based on the theoretical estimation of the drilling characteristic and a measurement of the drilling characteristic; and
   using the anomaly probability, decreasing a drilling operation setting by adjusting operation of subterranean drilling equipment, wherein the drilling operation setting includes at least one of a flow rate decrease in the flow rate, a WOB decrease of the weight on the drill bit, or a pressure decrease in a standpipe pressure of the drilling fluid at a standpipe.

2. The method of claim 1, wherein:
   determining the theoretical estimation of the drilling characteristic comprises determining a standpipe estimation of the standpipe pressure; and
   determining, utilizing the drilling event classification neural network, the anomaly probability that the drilling anomaly event is occurring comprises determining a washout probability of a washout event.

3. The method of claim 2, further comprising activating a trigger in response to determining that the washout probability exceeds a threshold value, wherein the trigger initiates decreasing the drilling operation setting via the flow rate decrease, the WOB decrease, and the pressure decrease.

4. The method of claim 2, further comprising physically measuring the flow rate measurement, the WOB measurement, and the depth measurement.

5. The method of claim 1, further comprising:
   generating, via a graphical user interface, a display of one or more of the measurement of the drilling characteristic or the theoretical estimation of the drilling characteristic; and
   indicating a start of the drilling anomaly event on the display.

6. The method of claim 1, further comprising training the drilling event classification neural network utilizing a loss function comprising a binary cross-entropy term weighted according to a first uncertainty, a mean squared error term weighted according to a second uncertainty, and a regularizing term.

7. The method of claim 6, wherein utilizing the loss function comprises nullifying the mean squared error term during a ground truth anomaly event.

8. The method of claim 1, wherein estimating the plurality of estimated parameters of the physical model comprises utilizing a convolutional neural network to generate estimations of the plurality of estimated parameters.

9. A system comprising:
a memory device; and
at least one processor configured to cause the system to:
receive a plurality of physical measurements related to a wellbore, wherein the plurality of physical measurements include a flow rate measurement of a flow rate of drilling fluid into the wellbore, a weight on bit (WOB) measurement of a weight on a drill bit in the wellbore, and a depth measurement of the drill bit in the wellbore;
based at least partially upon the plurality of physical measurements, estimate a plurality of estimated parameters of a physical model for estimating a drilling characteristic;
determine a theoretical estimation of the drilling characteristic based on the physical model using the plurality of physical measurements and the plurality of estimated parameters, wherein determining the theoretical estimation includes:
multiplying the depth measurement with a first parameter of the plurality of estimated parameters;
exponentiating the flow rate measurement by raising the flow rate measurement to a power of a second parameter of the plurality of estimated parameters; and
multiplying the WOB measurement with a third parameter of the plurality of estimated parameters;
determine, utilizing a drilling event classification neural network, an anomaly probability that a drilling anomaly event is occurring based on the theoretical estimation of the drilling characteristic and a measurement of the drilling characteristic; and
using the anomaly probability, decrease a drilling operation setting by adjusting operation of subterranean drilling equipment, wherein the drilling operation setting includes at least one of a flow rate decrease in the flow rate, a WOB decrease of the weight on the drill bit, or a pressure decrease in a standpipe pressure of the drilling fluid at a standpipe.

10. The system of claim 9, wherein the at least one processor is further configured to cause the system to:
receive, at periodic time intervals, measurement updates to the plurality of physical measurements related to the wellbore;
determine, at the periodic time intervals, estimation updates to the theoretical estimation of the drilling characteristic based on the physical model using the measurement updates and the plurality of estimated parameters;
receive, at the periodic time intervals, characteristic updates to the measurement of the drilling characteristic; and
determine, at the periodic time intervals and utilizing the drilling event classification neural network, anomaly updates to the anomaly probability that the drilling anomaly event is occurring based on the estimation updates and the characteristic updates.

11. The system of claim 10, wherein the at least one processor is further configured to cause the system to generate estimated parameter updates of the plurality of estimated parameters, at the periodic time intervals and based at least partially upon the measurement updates.

12. The system of claim 11, wherein the at least one processor is further configured to cause the system to:
generate, at the periodic time intervals and via a graphical user interface, a display of one or more of the estimation updates or the measurement updates; and
indicate a start of the drilling anomaly event on the display.

13. The system of claim 9, wherein the drilling event classification neural network comprises a long short-term memory neural network and one or more convolutional neural network layers.

14. The system of claim 9, wherein the at least one processor is configured to cause the system to estimate the plurality of estimated parameters of the physical model by processing the plurality of physical measurements through a convolutional neural network to generate the plurality of estimated parameters.

15. A non-transitory computer-readable medium comprising instructions that, when executed by at least one processor, cause the at least one processor to:
receive a plurality of physical measurements related to a wellbore, wherein the plurality of physical measurements include a flow rate measurement of a flow rate of drilling fluid into the wellbore, a weight on bit (WOB) measurement of a weight on a drill bit in the wellbore, and a depth measurement of the drill bit in the wellbore;
based at least partially upon the plurality of physical measurements, estimate a plurality of estimated parameters of a physical model for estimating a drilling characteristic;
determine a theoretical estimation of the drilling characteristic based on the physical model using the plurality of physical measurements and the plurality of estimated parameters, wherein determining the theoretical estimation includes:
multiplying the depth measurement with a first parameter of the plurality of estimated parameters;
exponentiating the flow rate measurement by raising the flow rate measurement to a power of a second parameter of the plurality of estimated parameters; and
multiplying the WOB measurement with a third parameter of the plurality of estimated parameters;
determine, utilizing a drilling event classification neural network, an anomaly probability that a drilling anomaly event is occurring based on the theoretical estimation of the drilling characteristic and a measurement of the drilling characteristic; and
using the anomaly probability, decrease a drilling operation setting by adjusting operation of subterranean drilling equipment, wherein the drilling operation setting includes at least one of a flow rate decrease in the flow rate, a WOB decrease of the weight on the drill bit, or a pressure decrease in a standpipe pressure of the drilling fluid at a standpipe.

16. The non-transitory computer-readable medium of claim 15, wherein the instructions, when executed by the at least one processor, cause the at least one processor to:
determine, utilizing the drilling event classification neural network, the anomaly probability by determining a stuck pipe probability of a stuck pipe event.

17. The non-transitory computer-readable medium of claim 15, wherein the instructions further cause the at least one processor to train the drilling event classification neural network utilizing a loss function comprising a binary cross-entropy term weighted according to a first uncertainty.

18. The non-transitory computer-readable medium of claim 17, wherein the instructions, when executed by the at least one processor, cause the at least one processor to estimate the plurality of estimated parameters of the physical model by utilizing a convolutional neural network to generate the plurality of estimated parameters.

* * * * *